US006226882B1

(12) United States Patent
Barr

(10) Patent No.: US 6,226,882 B1
(45) Date of Patent: May 8, 2001

(54) CUTOUT MARKING DEVICE FOR MARKING SHEET MATERIAL

(76) Inventor: William A. Barr, 5854 Buffalo River Rd., Earlysville, VA (US) 22936

( * ) Notice: Subject to any disclaimer, the term of this patent is extended or adjusted under 35 U.S.C. 154(b) by 0 days.

(21) Appl. No.: 09/258,874

(22) Filed: Feb. 26, 1999

Related U.S. Application Data

(60) Provisional application No. 60/082,834, filed on Apr. 23, 1998, and provisional application No. 60/076,349, filed on Feb. 27, 1998.

(51) Int. Cl.[7] .............................. G01B 1/00; B41F 31/00; B41K 1/42

(52) U.S. Cl. .............................. 33/528; 101/327; 101/333

(58) Field of Search .............................. 33/528, 668, 768, 33/42, 666, 562, 563, DIG. 10; 101/333, 327

(56) References Cited

U.S. PATENT DOCUMENTS

| | | | | |
|---|---|---|---|---|
| 3,745,664 | * | 7/1973 | Altseimer | 33/DIG. 10 |
| 3,913,235 | * | 10/1975 | Tenneson et al. | 33/DIG. 10 |
| 4,335,511 | | 6/1982 | Bowling | 30/366 |
| 4,345,381 | * | 8/1982 | Brislin | 33/DIG. 10 |
| 4,372,050 | * | 2/1983 | Eisenhauer | 33/DIG. 10 |
| 4,519,143 | * | 5/1985 | Correlli | 33/189 |
| 4,589,211 | * | 5/1986 | Policka | 33/DIG. 10 |
| 4,735,143 | * | 4/1988 | Weir | 101/333 |
| 4,969,269 | | 11/1990 | Dominguez | 30/360 |
| 5,471,930 | * | 12/1995 | Wood | 101/405 |
| 5,765,484 | * | 6/1998 | Lam | 101/327 |
| 5,791,252 | * | 8/1998 | Egan | 101/485 |
| 5,899,142 | * | 5/1999 | Suda et al. | 101/125 |

* cited by examiner

*Primary Examiner*—G. Bradley Bennett
*Assistant Examiner*—Gail Verbitsky
(74) *Attorney, Agent, or Firm*—Sheldon H. Parker

(57) ABSTRACT

An easy to use and accurate marking device enables the placement of an indicator mark on one side of a sheet of material to mark the periphery of an object. A marking line located within the base transfers a marking substance to the material upon contact. A recess within the base contains a contact pad that is moveable within the recess. The pad is maintained a predetermined distance from the base plate, when not under pressure, by a spring between the contact pad and the recess. At least one retaining member prevents removal of the contact pad from the base plate while permitting contact pad movement within the recess. At least one holding member, such as flanges forming a friction fit, is used to secure the base plate to the stationary object. A portion of the body of the marking device can be notched, giving a thinner cross-sectional thickness and placing at least a portion of the recess into the object. The gasket can also be used to reduce the contact distance between the base plate and the stationary object.

18 Claims, 11 Drawing Sheets

Figure 15
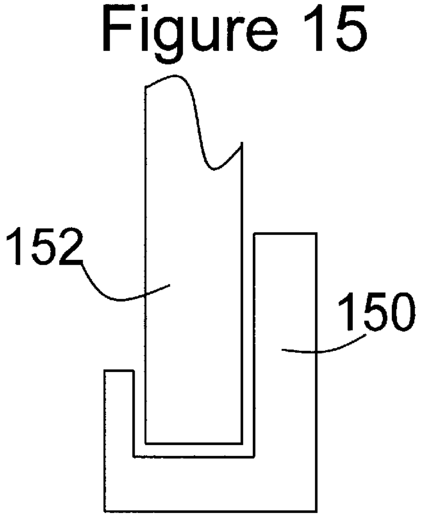
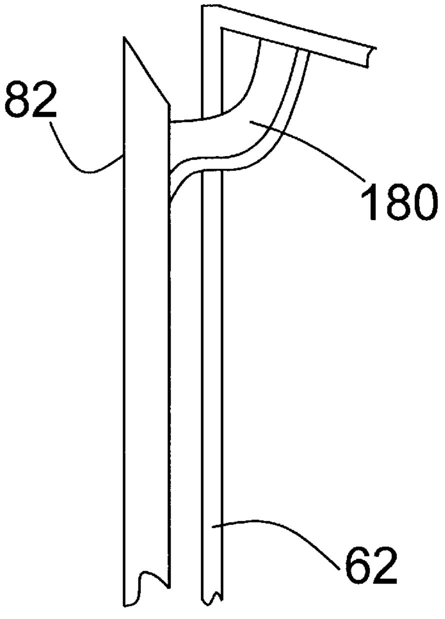
Figure 14
Figure 13
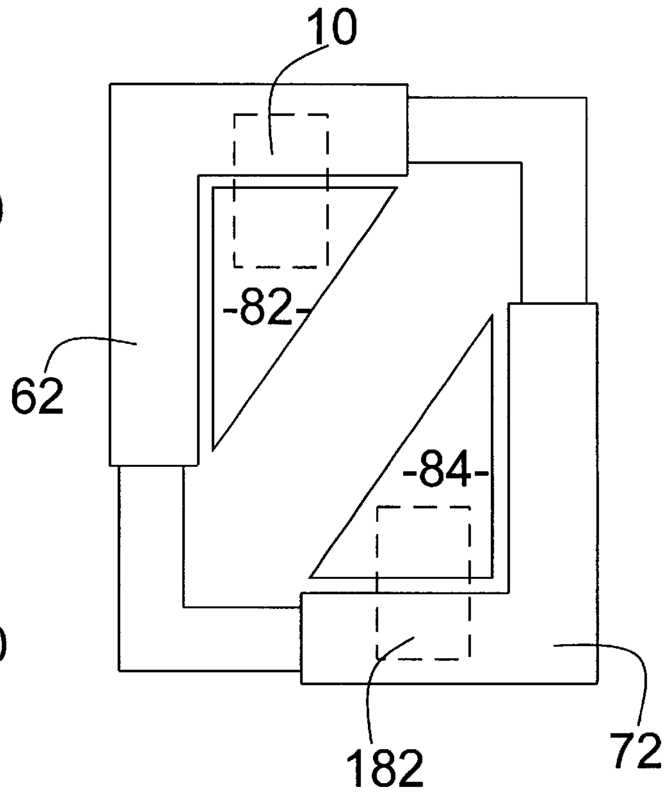

Figure 16
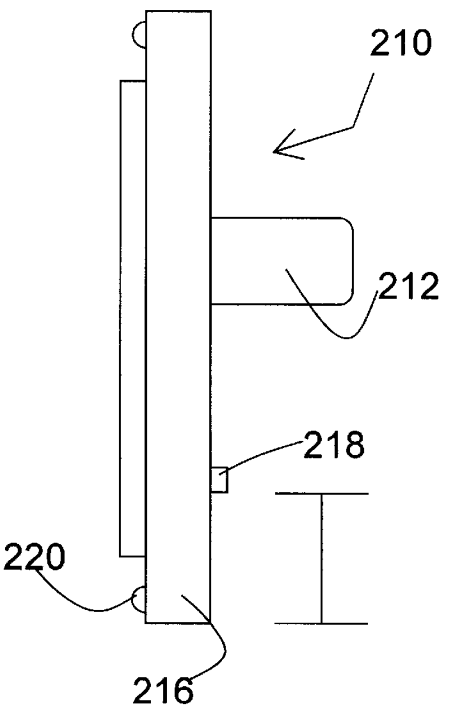
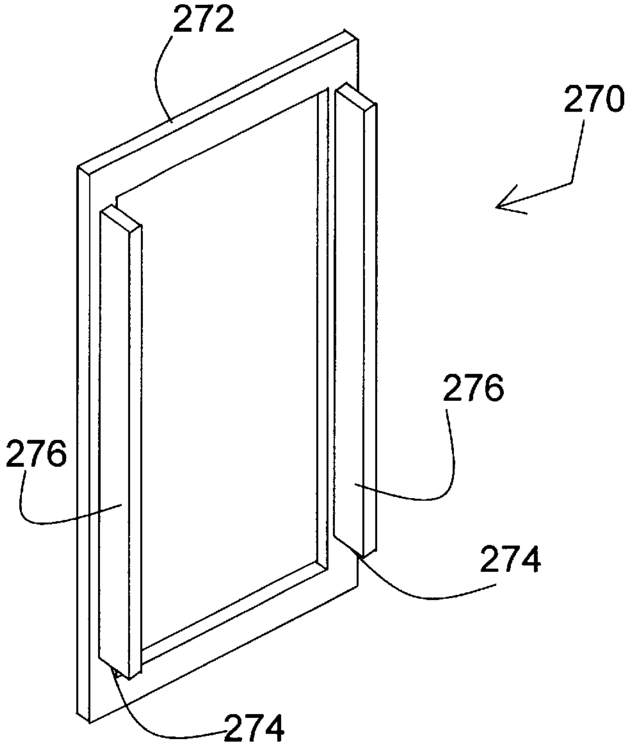
Figure 17
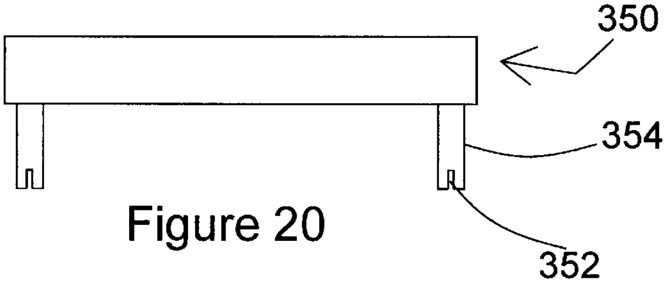
Figure 20

CUTOUT MARKING DEVICE FOR MARKING SHEET MATERIAL

This application claims benefit of Provisional applications 60/082,834, filed Apr. 23, 1998 and 60/076,349, filed Feb. 27, 1998.

BACKGROUND OF THE INVENTION

1. Field of the Invention

The invention relates to marking the back side of sheet material to enable openings to be accurately located and cut into the material.

2. Brief Description of the Prior Art

Plasterboard, also known as Sheetrock®, wallboard and gypsum board, has been used to replace plaster in construction for several decades. In comparison to plaster, plasterboard installs rapidly and requires substantially less manual labor. Plasterboard, however, still has installation problems which the industry has been attempting to solve.

Not the least of these problems is the marking of specific areas to be cut out. Currently these areas, such as for outlet boxes, heating vents, etc., are measured vertically and horizontally, from the adjacent plasterboard and floor or ceiling. The measurements are subsequently transferred to the plasterboard for cutting and installation. This is a time consuming process, even for professional installers. Plasterboard fortunately provides some leeway in that "mistakes" can be compensated through the use of spackle. The installation of wall paneling, however, does not provide any such leeway and a mistake in cutting can be quite costly.

The need for a rapid, easy to use marking device has been recognized in the construction field and is reflected in the prior art patents. U.S. Pat. No. 4,953,733 recognizes the need to mark plasterboard on the back side and has disclosed a device for use with electrical outlet boxes. The '733 device is provided with ears at each corner which fit within the outlet box. Arrow shaped marking elements are provided at the corners to engage the plasterboard. A securing screw can be inserted into a receiving hole within the body of the '733 device to secure the device to the outlet plug. Due to the construction of the '733 device, the marking elements are wedged into the plasterboard to mark the location of the plug outlet. Once the plasterboard is pressed onto the '733 device and removed for cutting the marking device is wedged into the plasterboard and must be removed prior to cutting the marked area. To prevent the device from being removed from the outlet with the plasterboard, the device must be secured through use of the securing screw. One of the problems with the '733 device is the necessity of securing the device to the outlet prior to measuring as well as removing the device after measuring, requiring substantial time on the part of the installer. Further, this device cannot be used on hard materials, such as paneling, tile or plywood. If the device is unsecured and retained within the plasterboard upon removal, the plasterboard must be maintained parallel to the wall during removal. Angling the plasterboard during removal could cause the ears of the device to catch on the outlet or even break up plasterboard.

U.S. Pat. No. 5,107,601, issued to Semchuck, uses a template consisting of indicia which define a hole pattern. These indicia are used to assist in drilling holes for mounting objects, such as towel bars. This device, however applies only to front mounted articles and does not provide any assistance with marking cut outs from the back of a rigid panel.

U.S. Pat. No. 4,969,269 discloses a device for punching cutouts through sheets of drywall. The '269 device has a pulley system which is used to cut the drywall in the shape of the outlet. The device is relatively expensive to produce and complicated to use.

U.S. Pat. No. 4,335,511 covers a marking device which marks the center of the outlet through use of a indicator which places an indentation in the wallboard at the center point of the outlet box. The wallboard is then horizontally placed, one half the depth of the wallboard is cut out in the shape of the outlet on the first side, the wallboard is turned over, and the remaining depth of the cutout is made. Cuts are made by striking the device which cuts into the wallboard. An inherent problem is that wallboard can break easily and unevenly when sharply struck, as it is brittle. Additionally, wallboard, is heavy and not easily moved or turned, rendering the '511 device awkward to use.

The disclosed invention overcomes the difficulties encountered in the prior art by providing a simple, inexpensive device for marking the reverse side of sheets of all types of material, such as paneling, plasterboard, floorboards, tiles, etc.

SUMMARY OF THE INVENTION

An easy to use and accurate marking device is disclosed to enable the placement of an indicator mark on one side of a sheet of material to mark the approximate periphery of a stationary object. The marking device has at least one marking line, each of the marking lines transferring a substance to the sheet of material upon contact. The marking line is placed into a base to maintain the marking line in a predetermined position.

In some embodiments the base is a plate with a recess having a periphery less than the base plate outer periphery in one side. A marking line is placed on the surface of the plate and, in most embodiments has a periphery less than the base periphery and greater than the periphery of the recess. A second marking line, or set of lines, can also be provided to provide off set marking on the sheet material.

A contact pad is moveable within the recess and is maintained a predetermined distance from the base plate, when not under pressure, by a spring between the contact pad and the recess back plate. One or more contact pad retaining members prevent removal of the contact pad from the base plate while permitting the contact pad to move within the recess. At least one holding member is used to secure the base plate to the stationary object.

The contact pad retaining member can be one or more horizontal securing members, such as screws, that extend through the recess back plate and are secured to the contact pad. The recess back plate is drilled to enable the securing member to slide freely within the back plate as pressure is applied to the contact pad. A helical spring can be used with the horizontal securing members, either separately or mounted on the securing member. When used separately, the helical spring is proximate the securing member, and preferably resting in opposing spring receiving areas within the recess and contact pad. In another embodiment, the marking device can have smaller, dual contact pads, each of which are independently affixed to the base.

The spring can also be a leaf spring that is either a separate unit or integral with the contact pad and/or the base plate. In one embodiment, a portion of the leaf spring is affixed to the recess back plate and another portion of the spring is affixed to the contact pad. The spring is free to flex within the recess in response to pressure applied to the contact pad while preventing the contact pad from separating from the base plate. If the spring is not affixed to the contact pad and recess back plate, a retaining member maintains the contact pad within the recess. The retaining member can be a notch within the contact pad that interacts with a flange in the recess. This prevents the contact pad from separating from the recess while enabling movement. The spring can also be two partial arcs that are an integral part of the contact pad or base plate.

Alternatively, the body of the marking device can be notched from the flanges to the contact pad recess area, thereby having a thinner cross-sectional thickness and placing at least a portion of the recess into the hollow opening of the stationary object.

The marking device is maintained on the stationary object using a friction fit through the use of at least one flange placed at a right angle to the base plate. The flange has a periphery less than that of the outer plate and greater than the periphery of the recess. The flange can be a single piece extending around all edges of the plate or can be two or more smaller, individual flanges. At least one pair of opposing smaller flanges are required to secure the marking device. A single stop flange is placed on the base plate to prevent downward movement of the marking device in relation to the stationary object. Extenders can be used to enable the flanges to be extended, thereby increasing the distance between said marking device and said stationary object.

In another embodiment the plate can be retained on the stationary object by a receiving sleeve dimensioned to receive a pair of flange plates. Each the flange plates has at one end a flange at right angles to the plate and a slide notch within the plates. The slide notches overlap one another and receive a securing member that also passes through the receiving sleeve and is secured to the base plate. Sliding the flange plates within the receiving sleeve increases or decreases the distance between the flanges. The flanges are maintained at the set distance by the securing member.

In embodiments where the flanges are extended to move the marking device further from the stationary object, a gasket can be used to enable the device to be used both when the device requires distancing and when no distancing is required. The gasket is dimensioned to lie adjacent the back of the base plate and is maintained in position by forming a friction fit with the holding member.

In another embodiment the marking device base can be an elongated flexible member having a contact side and a marking side that retains the marking line. The flexible member encompasses a moldable member that serves to maintain the base in a user set position.

An adjustable marking device is disclosed that has said base plate having L-shaped legs forming a polygon. In a rectangular configuration the first and third legs are hollow and have an interior diameter greater than the outer diameter the second and fourth legs, enabling the second and fourth legs to slide within the first and third legs. Retaining members, such as compressible buttons and receiving holes, are used to secure legs in a user determined position by preventing the legs from sliding. At least two marking lines within the first and third leg transfer a marking substance to the sheet of material. A pair of contact pads are affixed to the first and third legs by a curved spring that maintains the contact pads a predetermined distance from the surface plane of the first and third legs when not under pressure and enabling contact of the marking line by the sheet when pressure is applied. The adjustable marking device is secured to the stationary object by flanges at noted above.

To mark a sheet of material with the outline of a stationary object the base plate is secured to the exposed edge of the stationary object. The sheet of material is then placed against the contact pad and pressure applied to recess the contact pad and bring the material in contact with the marking line. The sheet of material is then removed.

BRIEF DESCRIPTION OF THE DRAWINGS

The advantages of the instant disclosure will become more apparent when read with the specification and the drawings, wherein:

FIG. 13 is a front view of springs for use with the embodiment of FIGS. 6 and 7;

FIG. 14 is a perspective view of the spring of FIG. 13;

FIG. 15 is a side view of an alternate spacer for use with the instant invention; and FIG. 16 is a side view of an alternate embodiment of the invention using tabs as the method of attachment;

FIG. 17 is a perspective rear view of an additional embodiment using vertical flanges as a means of attachment;

FIG. 20 is a end view of an alternate design for the vertical flanges for use with the disclosed marking device;

DETAILED DESCRIPTION OF THE INVENTION

The disclosed marking device enables a user to rapidly and accurately mark sheets of material with the outline and location of an object positioned behind the material, once mounted. Although cutting plasterboard and paneling at the location of outlet boxes is an obvious use of the marking device, other uses, such as marking air ducts, water pipes, etc. will become evident to those skilled in the art. The marking can, if applicable, be placed on the front of a panel, or other material, to indicate the presence of an underlying object, such as a gas line. The following descriptions relate to the mounting of a rigid material, such as plasterboard or paneling. Other materials, however, can be marked in the same manner as described herein and additional uses for the device will be evident.

The standard practice for marking and cutting outlets and other items located within walls or floors was through measuring. For instance, to cut a sheet of plasterboard for an outlet, the user would measure from the floor to the outlet box and then from the nearest wall to the object. These measurements would then be transferred to the piece of plasterboard. In the transfer, the user must also remember to allow for any off sets required between the floor and the plasterboard. The disclosed device enables the user to place the device onto the outlet, press the plasterboard against the sheet and then cut around the outline. Several embodiments are disclosed that automatically accounts for the floor/plasterboard offset.

Figure 1:
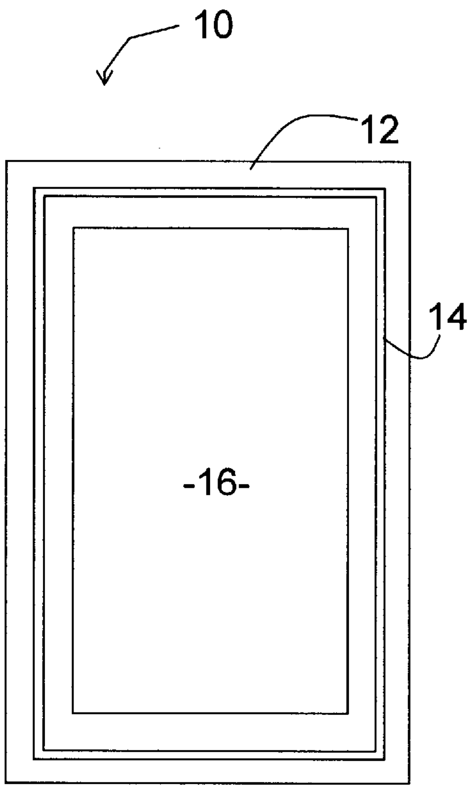
FIG. 1 is a front view of the marking device for use with electrical outlet boxes.
Figure 2:
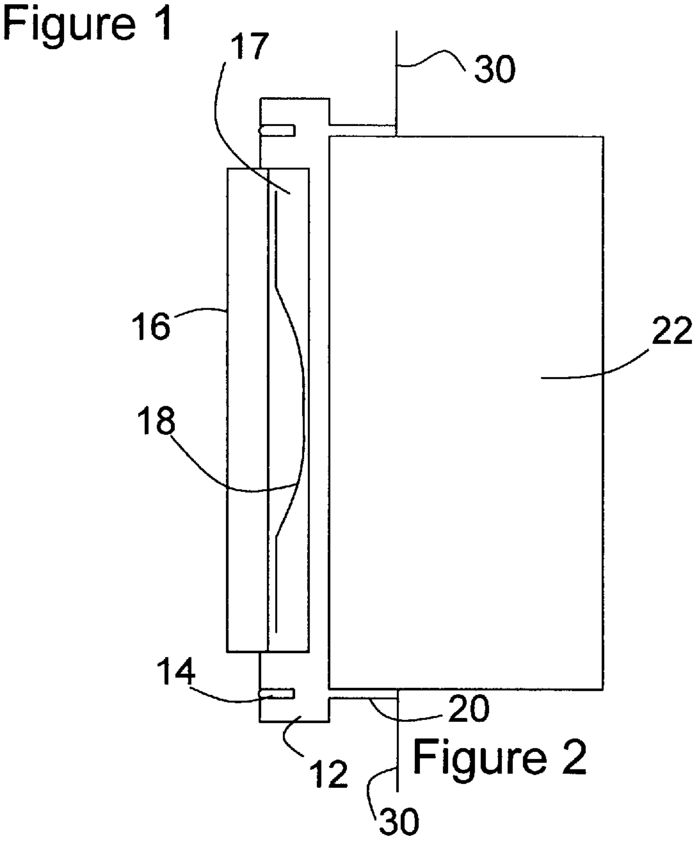
FIG. 2 is a side view of the marking device of FIG. 1.
Figure 3:
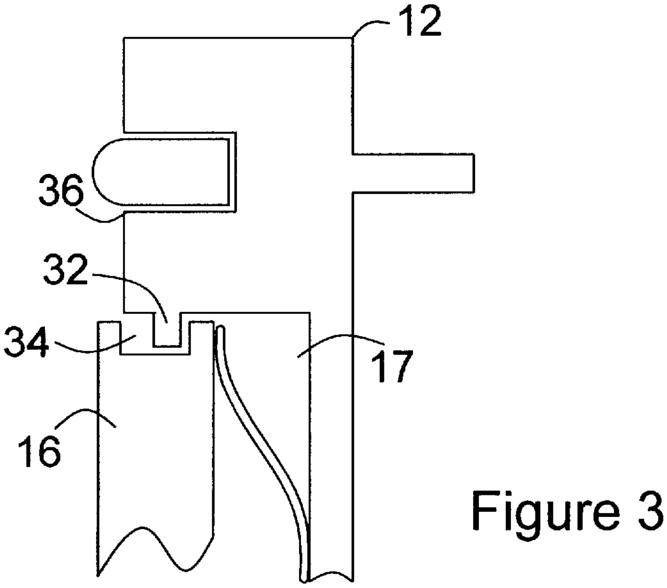
FIG. 3 is a cut away side view demonstrating one example of the interactionbetween the body of the marking device and the contact pad.

The embodiment of the marking unit, outlet device 10 illustrated in FIGS. 1 and 2, is configured for use with electrical plug and switch outlet boxes without the electrical components mounted. The mounting of the electrical components changes the dimensions and is addressed in specific embodiments as disclosed hereinafter. The flanges 20 on the back of the base plate 12 of the outlet device 10 are dimensioned to have an inner periphery approximately equal to the outer periphery of an outlet box 22. The actual marking of the sheet material is accomplished through use of an inking transfer 14 that extends around the center of the base plate 12 and, in this embodiment, forms an internal circuit around the base plate 12. The positioning of the inking transfer 14 on the base plate 12 is such that the mark left by the transfer is aligned with the periphery of the outlet box. The inking transfer 14 extends beyond the plane of the base plate 12 a distance sufficient to contact the plasterboard without interference. A portion of the inking transfer 14 is preferably recessed into the inking channel 36, as shown in FIG. 3, to allow the transfer 14 to bold sufficient ink for repeated uses without requiring re-inking. In alternative embodiments, the inking transfer can be broken lines, dots or any other configuration which is applicable to the end use. Although the continuous inking transfer is preferable, when the device has been modified for larger applications, the continuous line is not as critical.

In this embodiment, the base plate 12 has a U-shaped configuration formed from the base 12 and an aligning flange 20 at a right angle to the base plate 12. The aligning flange 20 is dimensioned to form a friction fit with the outlet box 22 and can extend around the entire perimeter of the base 12, or can be tabs, as illustrated hereinafter, which fit on each of the sides of the outlet box 20. The choice between a continuous flange or tabs is dependent upon material of manufacture, end cost, size and configuration of the marking unit. Whether the flange forms a friction fit with the exterior or interior, or a combination, of the outlet box is dependent upon material, size and location of the flange and will become evident based upon the teachings herein.

The contact pad 16 floats within the recess 17 of the base plate 12 with the outer surface of the contact pad 16 extending beyond the front plane of the base plate 12. The contact pad 16 is, except during the actual marking, maintained in the extended position through use of a spring 18 positioned between the contact pad 16 and the recess back plate 15. The contact pad 16 prevents the surface of the rigid sheet from coming in contact with the inking transfer 14 during the initial alignment of the sheet to the floor, door frames and already placed sheets. If the inking transfer 14 is not protected by the extended surface of the contact pad 16, any contact would mark the surface of the plasterboard. Thus, the surface of the plasterboard could be marked one or more times, or the markings smeared, during the alignment process. It is critical that the U-shaped base plate 12 has sufficient depth in its front recess to enable the contact pad 16 to adequately depress, thereby permitting the inking transfer 14 to contact the plasterboard. Although the spring 18 illustrated in FIG. 2 is a modified leaf spring, any type of spring(s) which can withstand the repeated compression can be used.

Figure 11:
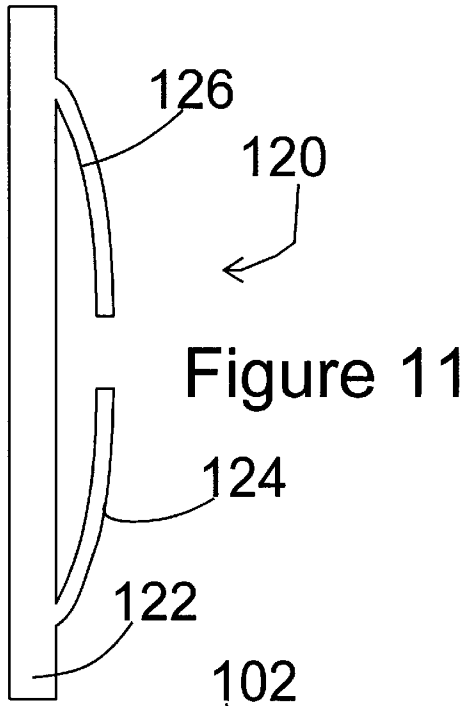
FIG. 11 is a one piece spring, contact pad construction for the marking device of FIG. 1.

An alternate design for the contact pad 120 is illustrated in FIG. 11 wherein the springs 124 and 126 are molded as an integral part of the contact pad 122. The springs 124 and 126, as illustrated, are separated to allow for extrusion or, if molded, easier removal. This is not necessary in some molding applications and a one piece spring can be easily substituted as will become apparent to those skilled in the art.

An example of one method of interaction between the recess 17 of the base plate 12 and the contact pad 16 is illustrated in FIG. 3. In this Figure the guide flange 32 is shown interacting with the pad channel 34. The guide flange 32 runs within the channel 34 to permit the contact pad 16 to move within the recess 17 without separation from the base plate 12. This is one example of how the contact pad 16 is maintained in position relative to the base plate 12 and other methods will become apparent to those skilled in the art depending upon material of manufacture and end cost. In some embodiments, disclosed hereinafter, the spring is secured to both the base plate and the contact pad through use of screws, thereby eliminating the need for the guide flange 32.

Figure 4:
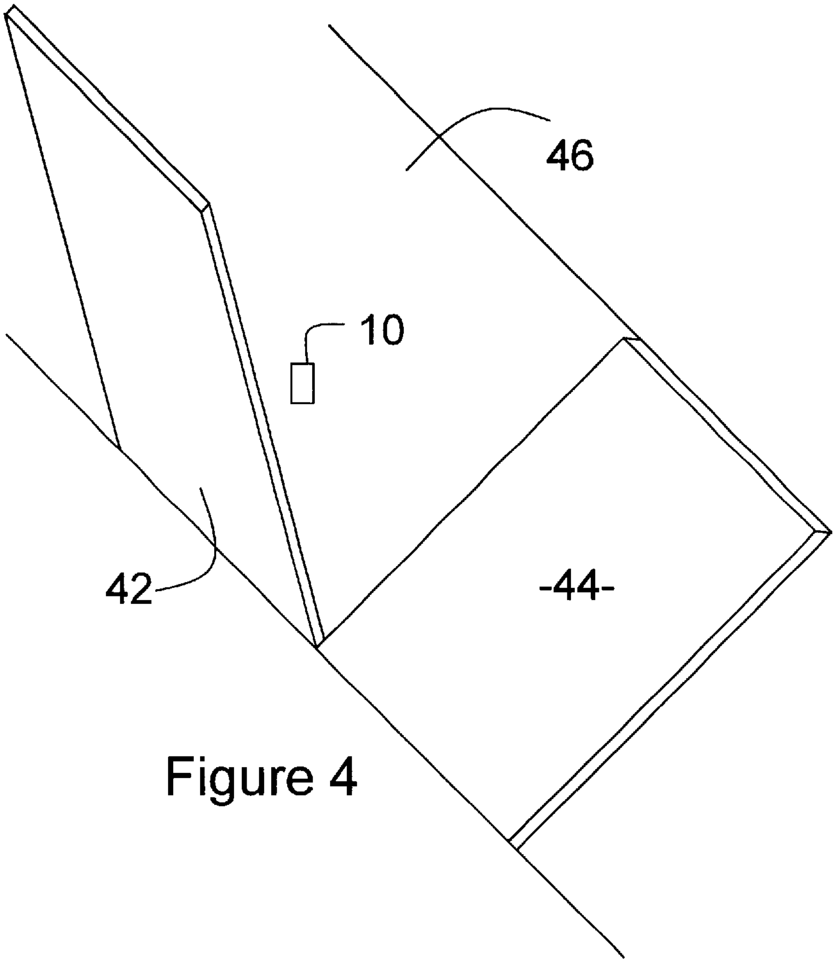
FIG. 4 is a perspective view of a piece of plasterboard being placed against a wall.

To use this embodiment of the device for marking a rigid surface, the flange 20 is placed around the outlet box 22, thereby bringing the base plate 12 in direct contact with the outlet box 22. Outlet boxes are installed to extend beyond the studs 30 a distance sufficient to place the edge of the outlet box 22 about flush with the surface of the plasterboard. This inherently provides a surface for the flange 20 to be slid over to maintain the marking device 10 in place. Once the marking device 10 is in place, the plasterboard 42, shown in FIG. 4, is placed into position, abutting the adjacent, installed, plasterboard 44 and approximately one (1) inch away from, and parallel to, the plane of the studs. Once positioned, the plasterboard is pressed at the location of the marking device, compressing the contact pad 16 and bringing the back of the plasterboard 42 in contact with the inking transfer 14. The plasterboard 42 is then brought to a position to permit the user access to the marked area on the back of the plasterboard. Whether just an end, side, or the entire sheet is moved away from the wall to gain access is user preference and has no effect upon the method of marking.

Figure 12:
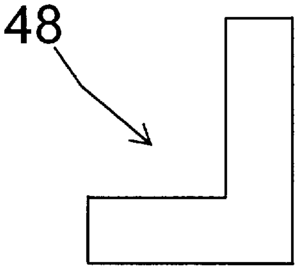
FIG. 12 is a side view of an V-shaped spacer for use with the instant invention.

In many applications the plasterboard must be positioned so that the bottom of the plasterboard is spaced from the floor to allow for settling and shifting of the floor, as well as protection from potential flood damage. One method of accounting for this offset is to place the plasterboard on a spacer, such as V-shaped spacer 48 illustrated in FIG. 12, that maintains the sheet a predetermined distance from the wall as well as raising the sheet the desired distance from the floor, generally approximately ½ inch. Other methods of accounting for the need to offset the plasterboard are disclosed hereinafter. The use of a spacer 48 enables the plasterboard to be aligned vertically with the adjacent, installed, plasterboard. The width and length of the legs of the spacer 48 determines the distance from the floor and wall to the plasterboard. The plasterboard, when positioned on the spacer 48 proximate the wall, must be close enough to permit the plasterboard to be easily pressed against the marking device 10. As the marking device 10 already extends approximately one inch from the wall, due to positioning of the outlet, the spacer 48 should position the plasterboard approximately one inch from the wall, thereby keeping the plasterboard approximately parallel to the plane of the wall.

Figure 24:
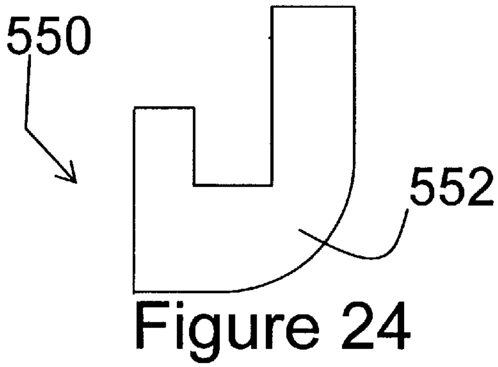
FIG. 24 is an alternate embodiment to the plasterboard holder of FIG. 15 wherein the corner of the holder is curved.

In FIG. 15 the spacer clip 150 is in a U-shape which retains the plasterboard 152 within the hollow of the clip 150. The clip 150 is preferably dimensioned to create a friction fit to enable the clip 150 to be placed on the plasterboard prior to raising the plasterboard to the vertical position. The friction fit should be sufficient to maintain the clip 150 on the plasterboard during the positioning process while enabling easy attachment and removal. As an alternative to the U-shaped spacer of FIG. 15, the curved edge spacer 550 of FIG. 24 has a curved outer edge 552 to enable the plasterboard to be easily rotated backwards toward the installer and thereby placed into a convenient position for cutting. Other methods of installing the plasterboard will become apparent to those stalled in the art.

Figure 5:
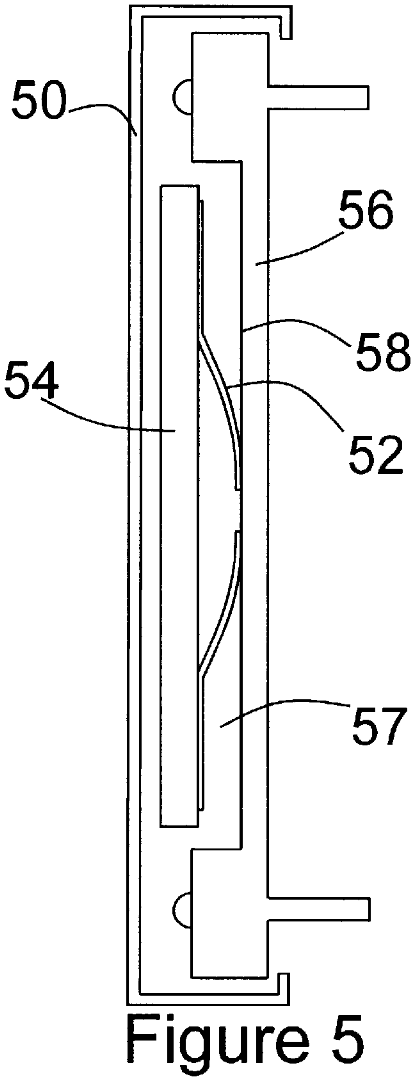
FIG. 5 is a cutaway side view of a marking device, having an alternate spring, with a closure cap in place.

To prevent the inking transfer 14 from drying out, or smearing ink on the user, a cap 50, as illustrated in FIG. 5, is placed over the base plate 56. The illustrated embodiment snaps onto the base plate 12, however other means for maintaining the cap on the base plate 12 can be used. The legs of the cap 50 should have sufficient length to avoid compressing the contact pad 54, thereby inherently avoiding contact between the surface of the cap 50 and the inking strips. The inking strips can also be friction fitted within channels, thereby enabling the ink strips to be easily removed and replaced.

In this embodiment, the contact pad 54, spring 52 and base plate 56 are affixed together by securing the open ends of the spring 52, the contact pad 54, and the back of the spring 52 to the recess back plate 58. The elements are secured together by means applicable to the materials being used. This method permits the contact pad 54 to move within the recess 57 while preventing the pad 54 from falling out. It should be noted, however, that the spring 52 must be dimensioned to have a sufficient portion of the body in contact with the recess back plate 58 to enable sufficient adhesion, while still enabling flexibility. This criteria is also applicable to joining sections of the contact pad 54 and spring 52 in the event the spring 52 and contact pad 54 are manufactured as separate structures. The portions of the spring 52 which are adhered to the pad 54 and the recess back plate 58 will be dependent on size and materials of manufacture and will be known to those skilled in the art.

Figure 6:
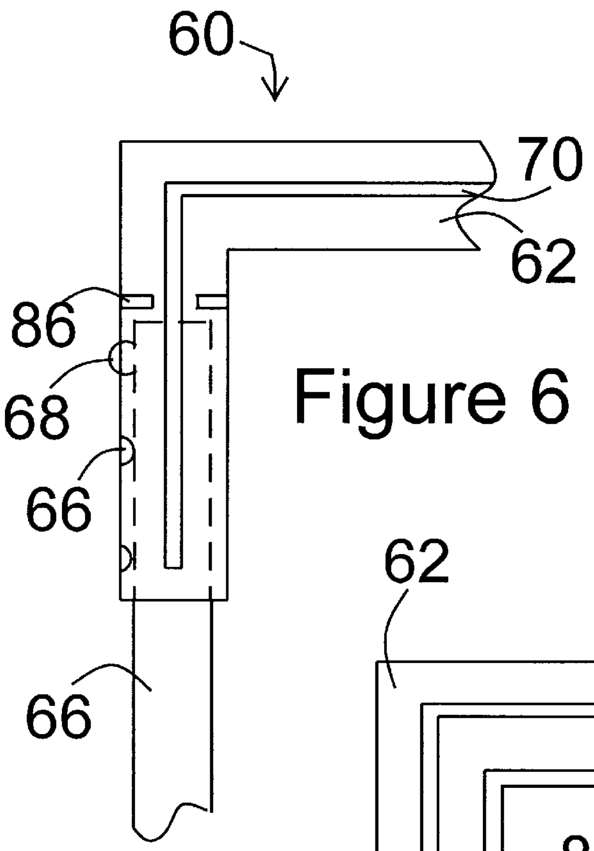
FIG. 6 is a fragmentary front view of an alternate embodiment of the marking device.
Figure 7:
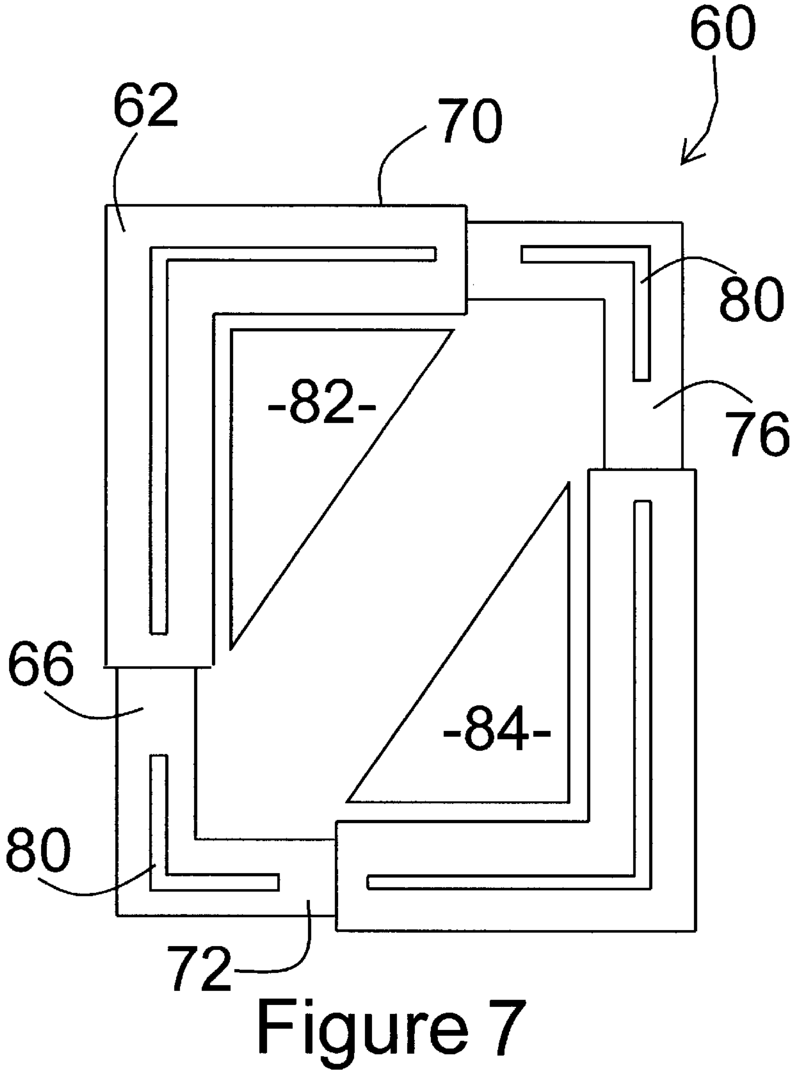
FIG. 7 is a front view of the alternate embodiment of FIG. 6.

The foregoing has been directed to outlet boxes, or other fixed size devices. In FIGS. 6 and 7 the marking device is adjustable to permit the perimeter of the device to be adjusted within a range of different sizes. Thus, the adjustable measuring device 60 can be used for measuring openings/cutouts such as is required for air conditioning/heating ducts that vary in size. The device 60 uses telescoping legs to adjust the length and width of the device 60, with locking buttons 68 to maintain the legs in the desired position. The telescoping technology and buttons 68 in the interior leg fitting into receiving holes 66 placed in the exterior leg, is well known in the prior art and is provided as one method to adjust the length and width of the device and other methods can be used. The adjustable marking device is divided into four V-shaped legs, exterior legs 62 and 72 and interior legs 66 and 76. Because of the reduced diameter of the interior legs 66 and 76, only the corner portion of the interior legs 66 and 76 is provided with an inking pad 80. In the illustrated embodiment the inking pad 80 is raised from the interior legs 66 and 76 a distance sufficient to compensate for the reduced diameter of the interior legs 66 and 76. To avoid damaging the inking pad 80 during contraction, it is recommended that the legs are provided with stops 86, or other means, to prevent the exterior legs 62 and 72 from coming in contact with the inking pad 80. Alternatively, the inking pad 70 can be placed only in the exterior legs 62 and 72; in this embodiment only two corners will be marked which could cause problems when exacting cuts are required.

In order to provide a raised contact pad, without eliminating the adjustability, triangular dual contact pads 82 and 84 are used rather than the single contact pad disclosed heretofore. The legs of the triangle are approximately equal to the exterior legs 62 and 72 to prevent interference from the opposing pad when the marking device 60 is placed in the fully contracted position. In order to support the contact pads 82 and 84, spring supports 180 and 182, illustrated in FIGS. 13 and 14, are provided. At one end the spring supports 180 and 182 are either adhered to, or integral with, the exterior legs 62 and 72, respectively. The other end of the spring supports 180 and 182 are affixed to, or integral with, the respective contact pads 82 and 84. The spring supports 180 and 182 are used to provide the structural support to the contact pads 82 and 84 and therefore must have sufficient resistance to maintain the contact pads 82 and 84 in the desired position. Further, the spring supports 180 and 182 must have sufficient mass to prevent the pads 82 and 84 from sliding from side to side or breaking. Alternative designs to the triangular contact pads can be used, however whatever the shape, care must be taken to allow for the interior legs 66 and 76 legs to retract to the stops 86 without interference from the contact pads.

Figure 9:
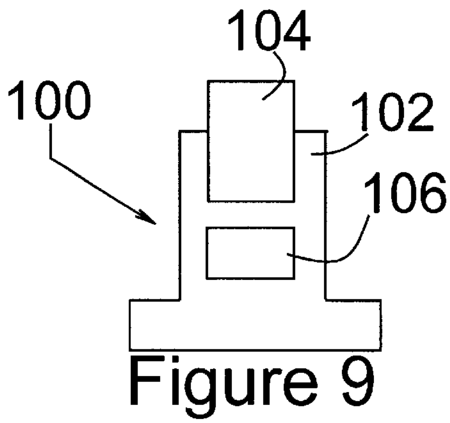
FIG. 9 is a cross sectional end view of the marking device of FIG. 8.
Figure 8:
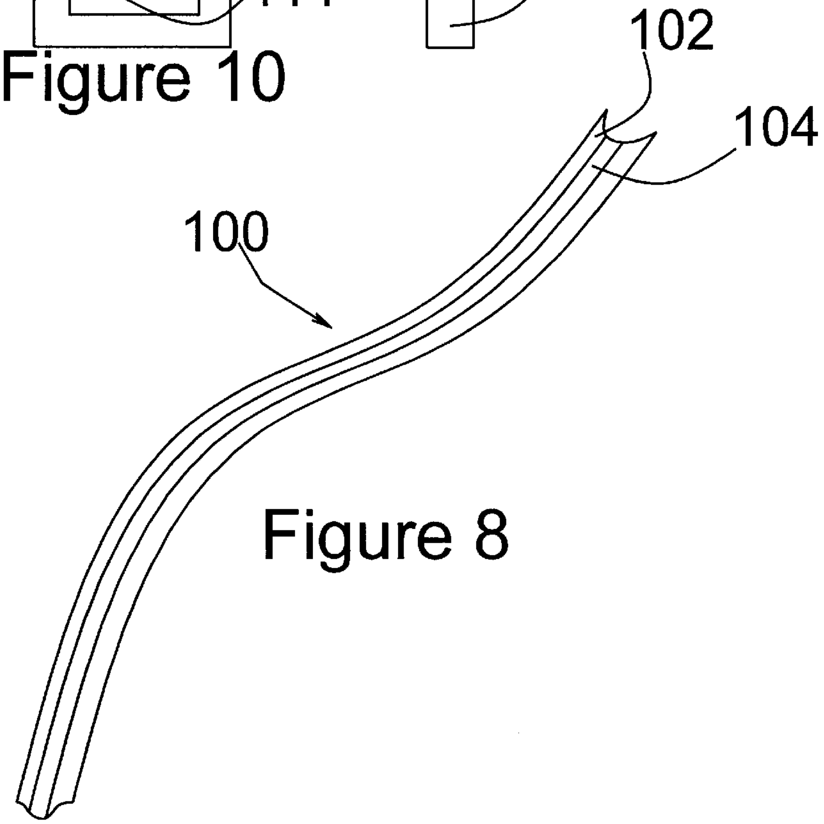
FIG. 8 is a fragmentary top view of a moldable marking device.

In the embodiment illustrated in FIGS. 8 and 9, the marking device 100 is a flexible member incorporating a lead or other bendable rod 106 within a soft, flexible member 102. A centered channnel within the surface of the flexible member 102 contains a flexible inking member 104 which extends along the length of the device 100. The soft flexible member 102 is a rubber or other soft, durable material which can be easily molded around the rod 106 and retain the inking member 104. The inking member 104 in this embodiment is dimensioned to extend beyond the plane of the flexible member 102.

Figure 10:
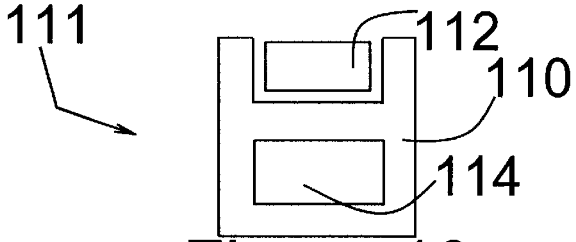
FIG. 10 is a cross sectional end of an alternate construction of the marking device of FIG. 8.

A cross section of an alternate embodiment is illustrated in FIG. 10, also using a memory member 110 to encase the bendable rod 114, wherein the inking member 112 is recessed within the memory member 110. During use the rigid panel is pressed down on the memory member 110, compressing the memory member 100 to permit contact with the inking member 112. Once released, the memory member 110 returns to its original position above the inking member 112. This embodiment enables the rigid member to avoid contact with the inking member 112 until pressure is applied.

The embodiments illustrated in FIGS. 8–10 are useful for marking non-rectangular configurations, such as drain and water pipes. For example, the flexible marking device 111 can be placed around the end of a pipe and the sheet material, such as tile, flooring, plasterboard or paneling placed in position over the device 111. The sheet material is then pressed onto the memory member 110 to contact the inking member 112, marking the reverse of the sheet with the outline of the pipe.

FIG. 16 illustrates an alternate means of attachment to the outlet box 22, wherein the marking device 210 is provided with opposing clips 212 and 214 (not shown) positioned along the vertical side of the base 216. The clips 212 and 214 can be either integral to the base 216 or affixed after molding by known means applicable to the material of manufacture. The clips 212 and 214 must be positioned on the base 216 a sufficient distance apart to provide a friction fit when placed within the interior of the outlet box. The friction fit must not, however, be so strong as to cause damage to the marking device 210 and enable the marking device 210 to be moved vertically within the outlet box. One or more small stops, or protrusions, 218 positioned on the base plate 216 prevent shifting, or slipping, of the marking device 210. The stops 218 are placed at a predetermined location on the base plate 216 and serve to account for the distance the plasterboard is to be mounted off the floor. To mark the plasterboard, the marking device 210 is placed onto the outlet box 22 with the stop 218 at the base of the outlet, positioning the marking pad 220 the predetermined distance closer to the floor. Thus, when the plasterboard is placed against the wall, the marking pad 220 defines the outline of the outlet box in a position lower than that of the actual outlet box. This eliminates the need to lift the entire sheet of plasterboard off the floor in the marking process.

The marking unit 270 illustrated in FIG. 17 uses a pair of flanges 276 to hold the base plate 272 within the outlet. The flanges 276 are dimensioned fit within the outlet box in a friction fit with the flange bottom edges 274 preventing the marking unit 270 from sliding downward. Although there is no critical width "W" dimensioning to the flanges 276 there is no reason to have a greater width "W" than necessary to maintain the marking unit 270 in position on the outlet. The length of the flanges 276 must be less than the height of the outlet box to enable the flanges 276 to fit within the box. Since the bottom edge 274 is used to prevent the box from slipping downward, the bottom edge 274 must be located on the base plate 272 in a position to compensate for the floor to plasterboard spacing. Although the flanges 276 do not need to extend to the top of the outlet, too short a flange 276 can permit the marking unit 270 to tilt within the outlet box. This embodiment would be used in conjunction with outlet boxes without a receptacle or light switch installed. The contact plate and inking member, not illustrated in this figure, function as described heretofore.

Figure 19:
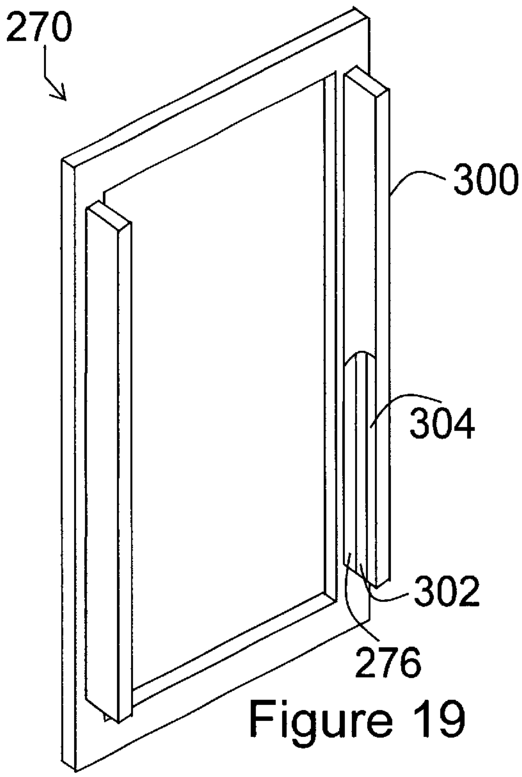
FIG. 19 is a perspective rear view of the flange extension placed onto one of the vertical flanges of FIG. 17.
Figure 18:
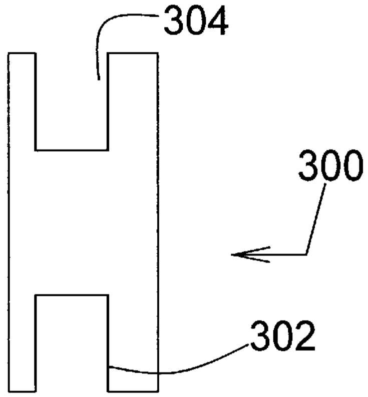
FIG. 18 is an end view of a flange extension for use with the embodiment of FIG. 17.

When remodeling, the receptacles or light switches are often already installed when the plasterboard is mounted. The foregoing marking units are applicable to outlets without mounted receptacles, or light switches, however once these are mounted the spacing requirements change to allow for the protrusion of the receptacle or light switch from the plane of the wall. For example, the flanges 276 of FIG. 17 can have a width "W" about ⅜ inch when used without a mounted receptacle. Once the receptacle is mounted, however, the flange 276 width "W" needs to be increased. An inexpensive, versatile way to accomplish this is through a receptacle extension 300 as illustrated in FIG. 18. The extension 300 is a modified H shaped with a flange channel 302 running along the length and dimensioned to fit over, or slide onto, the flange 276. The opposite side of the extension 300 is an outlet channel 304 that is dimensioned to fit over the edges of an outlet box. The extension 300 illustrates the flange channel 302 centered and the outlet channel 304 offset. In the embodiment illustrated in FIG. 17, the flanges 276 fit within the outlet box, and therefore, for the outlet channel to fit over the edges of the outlet it must be offset in relation to the flange channel 302. The need to offset will vary depending upon the construction of the flanges. The dimensions of the extension 300 can vary depending upon the end use, i.e. a light switch requires a greater extension distance than an electric receptacle. In FIG. 19 the extension 300 has been placed on one of the flanges 276, extending the distance between the marking unit 270 and the outlet box. This extension is required to enable the marking device to be securely mounted to the outlet box with the receptacle or light switch in place. Without the extension, the marking device cannot be securely attached to the outlet box as the receptacle or light switch protrudes a sufficient distance to prevent the flanges 276 from properly gripping the outlet box.

Figure 21:
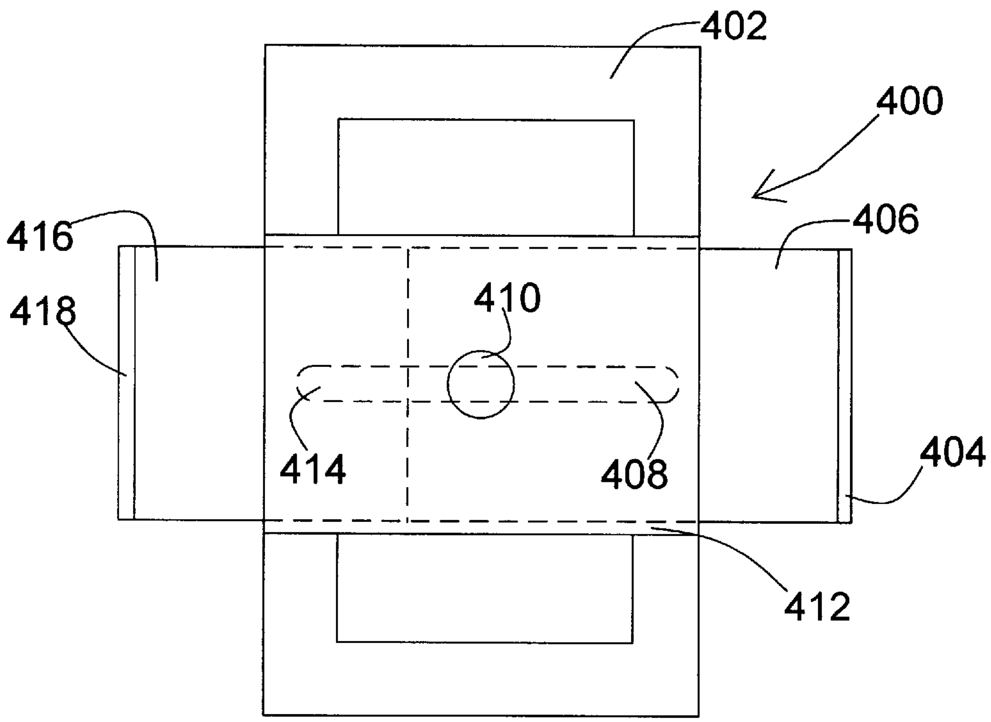
FIG. 21 is a back view of a marking device incorporating a horizontal slide bar to adjust the distance between vertical flanges.

In the embodiment of FIG. 20 the flanges 354 are provided with outlet channels 352 that snap onto the sides of the outlet box rather than sit inside the box. If the flanges 354 are to also serve to prevent slippage of the device or provide the offset, the dimensioning must be as noted in conjunction with other embodiments. In the embodiment of FIG. 21 the base plate 402 is manufactured with a back sleeve 412 dimensioned to receive an under flange plate 416 and a top flange plate 406. Channel 408 and 414, respectively, are placed within each of the flange plates 406 and 416 and are dimensioned to overlap one another. The under flange plate 416 and the top flange plate 406 are moveable within the back sleeve 412 in order to enable the flanges 418 and 404 to move with respect to one another as well as to the base plate 402. A fastener receiving hole 410 is placed within the sleeve 412 to enable access to the channels 408 and 414. The fastener member can be a bolt or other device that will prevent the flange plates 406 and 416 from movement relative to one another. By preventing the movement between the under flange plate 416 and the top flange plate 406, the flanges 404 and 418 can be positioned to provide a friction fit within multiple sized outlets. This enables the marking unit 400 to be used for double outlets, or to mark other wider devices, as well as the standard single outlet.

Figure 22:
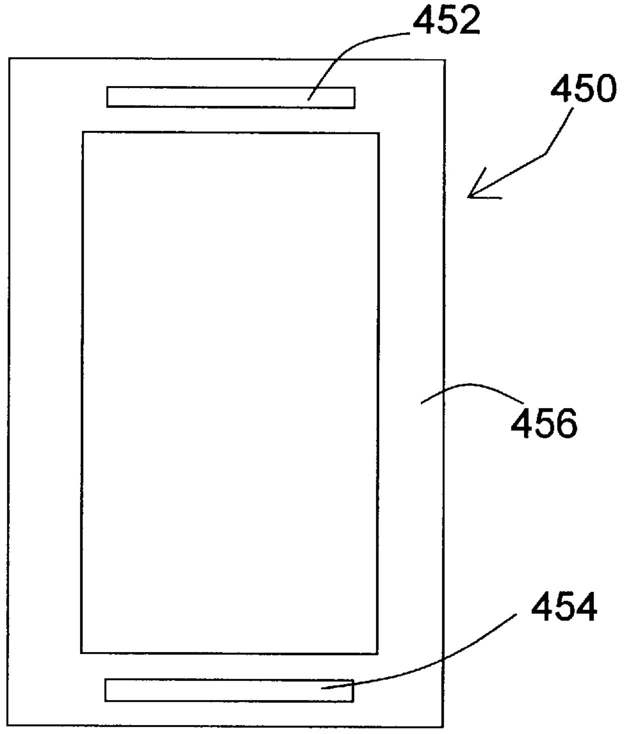
FIG. 22 is a back view of a further design of a marking device using horizontal flanges.

In FIG. 22 the flanges 452 and 454 are placed at the top and bottom of the base plate 456. The flanges 452 and 454 are positioned to form a friction fit with the top and bottom of the outlet box, thus enabling the marking unit 450 to be used with double receptacle boxes. If dimensioned to fit within the outlet box, the bottom flange 454 serves to prevent the base plate 456 from sliding downward and, as noted heretofore, can be offset in relation to the outlet box in order to provide the plasterboard/floor clearance. If the flanges 452 and 454 are dimensioned to be placed on the exterior of the box, the top flange 452 prevents the device from sliding. Alternatively, flange receiving notches can be positioned at the desired locations within the base plate and separate flanges snapped in at the desired location.

Figure 23:
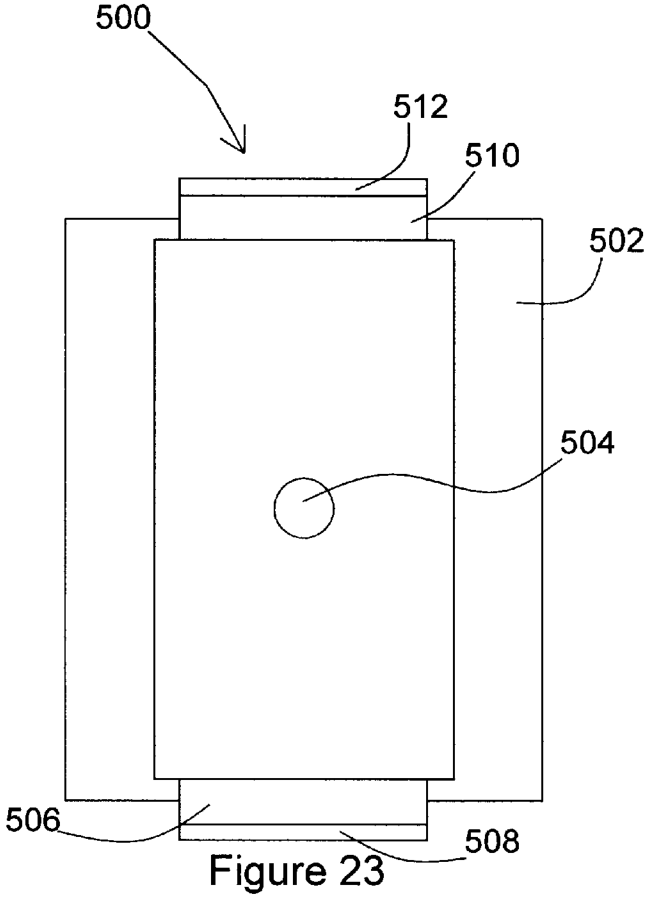
FIG. 23 is a back view of another marking device incorporating a vertical slide bar to adjust the distance between horizontal flanges.

In FIG. 23 the moveable flange plates of FIG. 21 are rotated and placed to be in contact with the top and bottom of the outlet box. In this embodiment the upper flange plate 510 and lower flange plate 506 are extended until the flanges 512 and 508 will, when mounted, form a friction fit with the outlet box. The flanges 512 and 508 are then secured in that position through use of the locking device 504. This embodiment enables the plasterboard/floor clearance to be varied by changing the distance between the bottom of the base plate 502 and the bottom of the outlet box.

Figure 25:
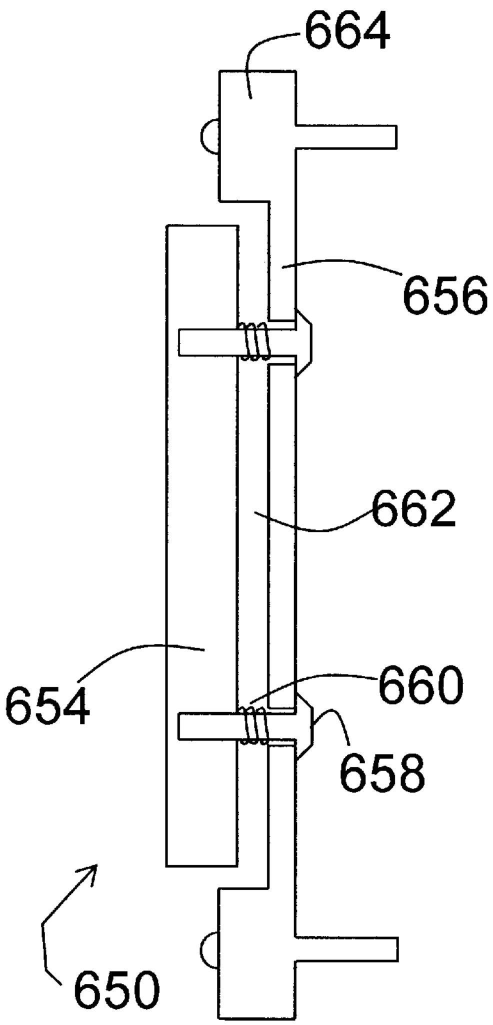
FIG. 25 is a cutaway side view of an alternate embodiment using screws to hold the springs between the base plate and contact pad.

In FIG. 25 the outlet marker 650 has the contact pad 654 maintained in position within the recess 662 of the base plate 664 through the use of screws 658. In a full contact pad, as illustrated in FIG. 25, there would generally be four (4) springs 660 held in place by the screws 658. The screws 658 must be dimensioned to prevent their protruding through the contact pad 654 in order to prevent damage to the sheet material. The recess back plate 656 is drilled out to receive the screws 658 and enable the screws 658 to slide, without excessive vertical movement, within the back plate 656. Thus, when pressure is applied to the contact pad 654, the screws 658 move horizontally, extending toward or into the outlet box. The springs 660 must have sufficient resistance to maintain the contact pad 654 in the extended position during non-use. The screws can also be replaced with plastic pins that are glued into the contact pad and float freely within the base plate.

Figure 26:
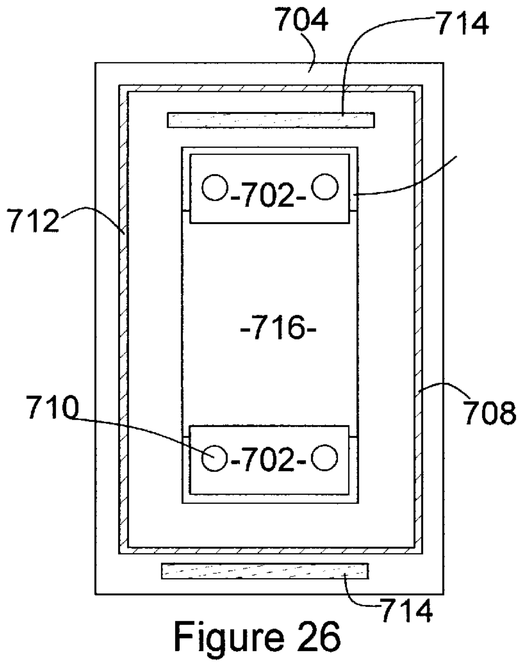
FIG. 26 is a front view of an alternate marking device having dual contact pads and a secondary marking strip.

In FIG. 26, the dual contact pads 702 of the marking device 700 extend over only the top and bottom portion of the device 700. The base plate 704 is recessed, as described heretofore, however in this embodiment the recessed back 706 covers only a portion of the base plate 704, thereby leaving open area 716. The contact pads 702 are affixed to the recessed back 706 through use of springs and screws 710 as described in FIG. 25. The dual contact pads 702 provide sufficient resistance for the plasterboard while cutting the cost of manufacture. Additionally, if the open area 716 is sized appropriately the marker 700 can be used to mark plasterboard on outlet boxes containing receptacles or light switches. Alternatively, the dual contact pads 702 can be used with a recess area that extends the full length of the device as described heretofore. Illustrated in this Figure are the dual inking markers 708 and 714. The fill inking marker 708 extends around the periphery of the base plate 704 as noted in the prior embodiments. A pair of horizontal secondary markers 714 are provided to enable the marker 700 to also mark the plasterboard with the offset marking as noted heretofore. Preferably the full inking marker 708 and secondary markers 714 are separate colors to easily define which of the marks is offset and which is the true location of the outlet box, although other differentiation markers can be used. Both the dual contact pads and the secondary markers can be incorporated with any of the forgoing embodiments and modifications will be evident to those skilled in the art.

Figure 27:
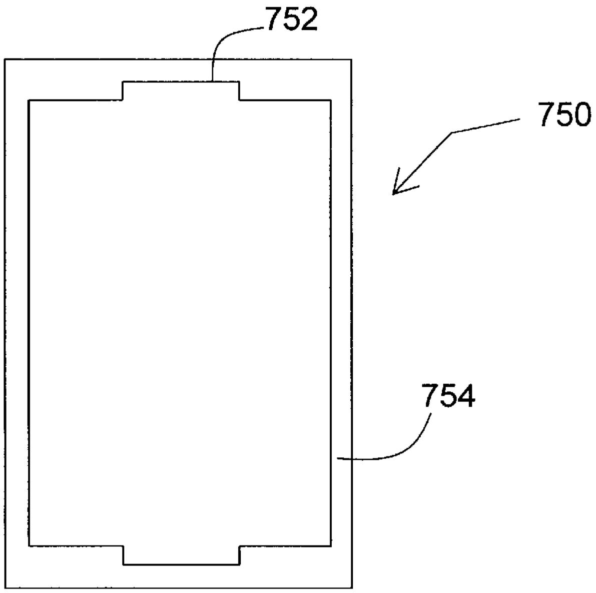
FIG. 27 is a rear view of a base plate containing notches to receive the screw bracket of mounted receptacles and light switches.

In FIG. 27, the back of the base plate 754 has been notched to provide recessed space for the screw bracket of the receptacles and light switches. The notches 752 provide the space required to enable the base plate 754 to sit in full contact with the outlet box. The notched base plate 754 can be incorporated with any of the foregoing embodiments.

Figure 28:
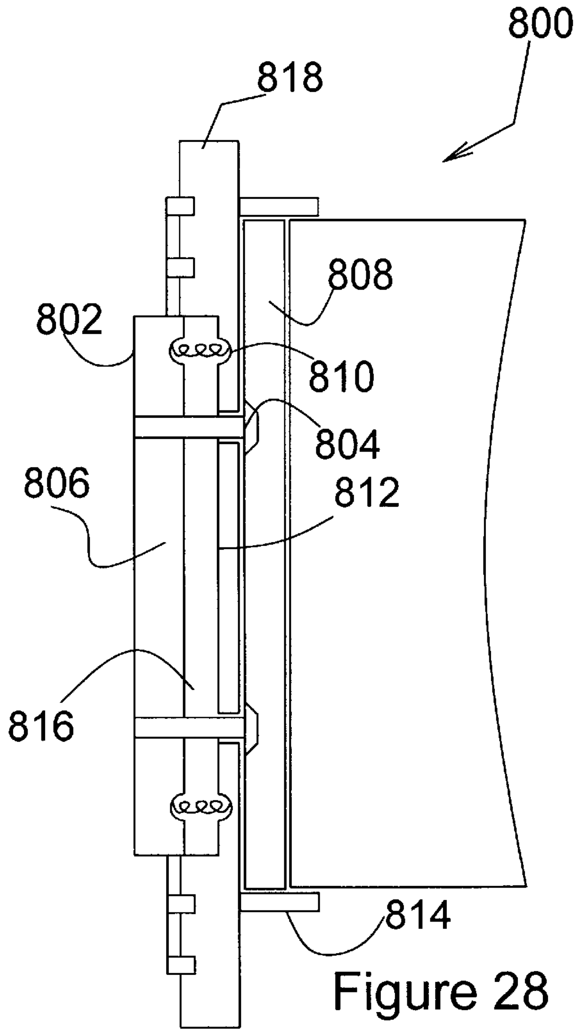
FIG. 28 is a cutaway side view of an alternate embodiment incorporating screws and separately placed springs set within notches.

In the marking device 800 of FIG. 28, the contact pad 806 is maintained in position through the use of screws 804, as noted heretofore with reference to FIG. 25. The springs 802 in this embodiment are, however, separate from the screws 804. In this embodiment the springs 802 have been placed in recesses 810 that are formed in the material of manufacture in a manner that is appropriate the specific material, i.e. molded, drilled, etc. The recesses 810 have sufficient depth to prevent the springs 802 from shifting along the surface of either the contact pad 806 or the recess back plate 812 during use and storage. The springs 802 also have sufficient length to maintain tension between the contact pad 806 and the recess back plate 812, further preventing any shifting. The screws 804 float within the recess back plate 812 while being securely affixed to the contact pad 806, thereby enabling the contact pad 806 to move within the recess 816.

In this embodiment a gasket 808 is placed between the flanges 814 to move the contact point between the marking device 800 and the outlet box. The flanges 814 in this embodiment have been lengthened to accommodate for the addition of a receptacle. Since, in all embodiments, the outlet boxes and the base plates should be in contact to prevent the marking devices from tilting, the gasket 808 is added to compensate for the space otherwise occupied by the receptacle. The gasket 808 enables the marking device 800 to be used with a mounted receptacle by removal of the gasket 808 or without a receptacle by inclusion of the gasket 808. The gasket 808 should have a thickness proportional to the lengthening of the flanges 814. For flanges that have been lengthened from about ⅜ inch to about ⅝ inch, the gasket is preferably about ¼ inch thick. The gasket should have a sufficient rigidity to enable a fiction fit within the base plate to maintain the gasket in place. Too thin or flexible a material will tend to slip within the base plate. The gasket should also be cut to correspond to the configuration of the back of the base plate used.

Figure 29:
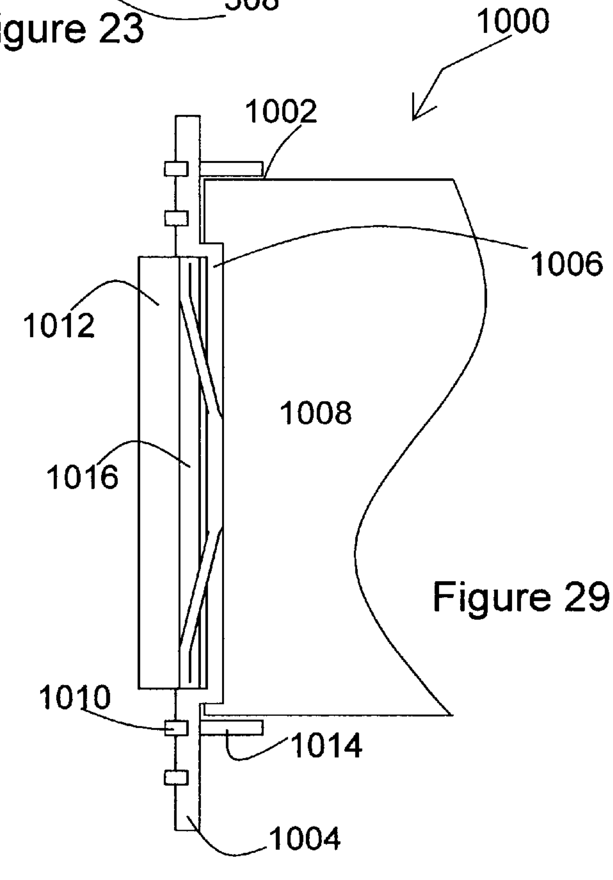
FIG. 29 is a cutaway side view of another embodiment of the marking device with the contact pad recess extending into the outlet box.

The marking device 1000 of FIG. 29 provides a thinner front plate 1004 than disclosed in other embodiments. This reduction is enabled by placing notches 1002 into the body 1006. The notches 1002 reduce the thickness of the front plate 1004 from the flanges 1014 to the recess body 1006 thereby reducing the amount of material required for manufacture. The body 1006 contains the compression area 1016 for the contact pad 1012 and, when the device 1000 is mounted, extends into the outlet box 1008. The front plate 1004 must have a thickness sufficient to receive the marking strips 1010 and provide sufficient rigidity and strength to prevent breakage. The marking device illustrated in this embodiment has a upper notch 1002 that extends from the flange 1014 to the body 1006. This can be reduced to a notch having sufficient dimensioning to enable the marking device to receive the outlet box, similar to the lower notch on the marking device 1000.

Figure 30:
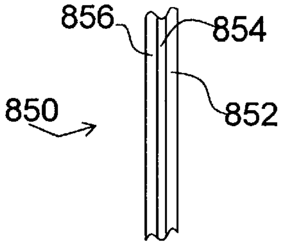
FIG. 30 is a side view of marking sheet material having an adhesive surface.

The inking marker 850 of FIG. 30 can also be provided in sheets or strips for use in replacing the existing inking markers in any of the foregoing embodiments or for marking other items. The marking material 856 is provided with an adhesive backing 854 and a protective covering 852. The marking sheet 856 can be cut to the desired size, the protective covering 852 removed and the cut portion of the marking sheet 856 applied to the object. This can be useful to locate where fasteners are to be installed in walls when hanging objects that conceal the desired location, i.e. pictures, mirrors, plaques, etc.

Although the preferred method of marking is through the use of ink, other materials that will leave a mark can be used, such as chalk or lead. The powdered materials would be retained in a flexible holder with holes sufficient to permit the powder to exit the holder when the plasterboard was pressed against the device.

It should be obvious to anyone skilled in the art that the dimension of any of the foregoing; embodiments can be altered for use with other specific sized outlets, such as double receptacle outlets, car stereo cutouts, A/C inlet/outlets, etc. Additionally, any of the foregoing can be offset to compensate for the plasterboard/floor clearance. It will also be evident that the size of the flanges can vary and that the channel attachment can replace the friction fit of the flanges in any of the embodiments.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A marking device for placing an indicator mark on one side of a sheet of material to mark the approximate outer periphery of a stationary object, said marking device having:

- a base plate, said base plate having:
  - a first side, a second side, an outer periphery and a recess in said first side, said recess having a back plate and a back plate periphery, less than said base plate outer periphery
  - at least one contact pad, said contact pad having a contact pad periphery less than said recess and being recessable within said recess,
  - at least one spring, said at least one spring being within said recess between each of said at least one contact pad and said back plate, said at least one spring maintaining at least a portion of said contact pad a predetermined distance from said recess back plate when not under pressure, said predetermined distance extending beyond said first side's plane,
  - at least one contact pad retaining member, said contact pad retaining member preventing removal of said contact pad from said base plate while permitting said contact pad to move within said recess,
  - at least one marking line, each of said at least one said marking line having a periphery greater than said contact pad periphery and transferring a marking substance to said sheet of material upon contact with said material,
  - at least one holding member, said at least one holding member securing said base plate to said stationary object.

2. The marking device of claim 1 wherein said contact pad retaining member is at least one horizontal securing member extending from a said second side of said recess back plate into said contact pad, said securing member freely sliding within said recess back plate and being secured to said contact pad.

3. The marking device of claim 2 wherein said spring is helical.

4. The marking device of claim 3 wherein said helical spring is proximate said horizontal securing member, said spring resting in spring receiving areas, said spring receiving areas opposing one another within said recess and said contact pad.

5. The marking device of claim 3, wherein said horizontal securing member passes through said helical spring, thereby retaining said spring in position between said recess and said contact pad.

6. The marking device of claim 1 wherein said contact pad retaining member is said spring, a portion of said spring being affixed to said recess back plate and another portion of said spring being affixed to said contact pad, said flexing within said recess in response to pressure applied to said contact pad while preventing said contact pad from separating from said base plate.

7. The marking device of claim 1 wherein said contact pad further comprises a notch, said notch interacting with a flange in said recess to prevent said contact pad from separating from said recess while enabling said contact pad to move within said recess.

8. The marking device of claim 1 wherein said holding member is a pair of opposing flanges at right angles to said second side of said base plate, said flanges extending along at least a portion of said periphery.

9. The marking device of claim 1 further comprising a stop flange, said stop flange preventing downward movement of said marking device in relation to said stationary object.

10. The marking device of claim 1 wherein said spring is two partial arcs, said partial arcs being an integral part of said contact pad.

11. The marking device of claim 9 further comprising a pair of extenders, each of said extenders having a length approximate said opposing flanges and affixing to said opposing flanges along one length and to said stationary object along an opposing length, thereby increasing the distance between said marking device and said stationary object.

12. The marking device of claim 1 wherein said holding member is a receiving sleeve, said receiving sleeve dimensioned to receive a pair of flange plates, each of said flange plates having, at a first end, a flange at right angles to said plate and a slide notch within each of said plates, said slide notches overlapping one another; a securing member, said securing member passing through said receiving sleeve and said notches into said base plate wherein said plates sliding within said receiving sleeve increases or decreases distance between said flanges and said securing member maintains said flanges at a user set distance.

13. The marking device of claim 1 further comprising a second contact pad, each of said contact pads being independently affixed to said base.

14. The marking device of claim 1 further comprising a second marking line, said second marking line being offset from a first marking line.

15. The marking device of claim 1 further comprising a gasket, said gasket being dimensioned to lie adjacent said second side of said base plate and form a friction fit with said holding member.

16. An adjustable marking device for placing an indicator mark on one side of a sheet of material to position the approximate periphery of a stationary object on said sheet, said marking device having:

- a base plate having four L-shaped legs, a first and third of said legs being hollow and having an interior diameter greater than a second and fourth legs outer diameter, the outer diameter of said second and fourth legs slideably fitting within said interior diameter of said first and third legs,
- leg retaining members, said leg retaining members securing said L-shaped legs in a user determined position by preventing said second and fourth legs from sliding within said first and third, at least two marking lines, said at least two marking line being retained within said first and third legs and transferring a marking substance to said sheet of material, a pair of contact pads, said contact pads affixed to said first and third legs by a curved spring, said spring maintaining said contact pads a predetermined distance from said first and third legs surface plane when not under pressure and enabling contact of said marking line by said sheet when pressure is applied to said contact pads, at least one holding member, said at least one holding member securing said base plate to said stationary object.

17. The method of marking a sheet of material with an outline of a stationary object's position using a marking device having a base and a marking line to transfer a mark onto said sheet of material, comprising the steps of:

securing said base to an exposed edge of said stationary object, placing said sheet of material against a contact pad, applying pressure to said material, causing said marking line to come in contact with said sheet of material;

removing said sheet of material.

18. A marking device for placing an indicator mark on one side of a sheet of material to mark the approximate periphery of a stationary object, said marking device having at least one marking line, each of said at least one marking line transferring a marking substance to said sheet of material upon contact with said material, an elongated flexible base member having a contact side and a marking side, said marking side retaining said marking line and a flexible member, said moldable member being encompassed within said base member, said flexible member maintaining said marking device in a user set position, wherein said marking device is set to outline said stationary object and is maintained in said outline by said flexible member and transfers said outline to said sheet of material placed upon application of said sheet of material against said marking line.

* * * * *